July 4, 1972   GORO HASEGAWA ET AL   3,674,343

LENS BARREL

Filed Sept. 15, 1970

INVENTORS
GORO HASEGAWA
BY MASAHARU ITO

McGlew and Toren
ATTORNEYS

United States Patent Office 3,674,343
Patented July 4, 1972

3,674,343
LENS BARREL
Goro Hasegawa, Tokyo, and Masaharu Ito, Kawasaki, Japan, assignors to Canon Kabushiki Kaisha, Tokyo, Japan
Filed Sept. 15, 1970, Ser. No. 72,364
Claims priority, application Japan, Sept. 22, 1969, 44/89,353; Feb. 13, 1970, 45/14,047
Int. Cl. G02b 7/02
U.S. Cl. 350—250                                    3 Claims

ABSTRACT OF THE DISCLOSURE

A lens barrel which has a focusing ring, a middle cylinder, an outer cylinder fixed to a camera body, a front lens group holder, and a rear lens group holder, wherein the middle cylinder and the outer cylinder are rotatably screwed to each other, the focusing ring is integrally connected to the middle cylinder in a rotatable manner, the middle cylinder has two screwed parts having different leads, and the front lens group holder and the rear lens group holder are screwed to each of said screwed parts, the front lens group holder being engaged, with key groove, to the rear lens group holder which is engaged, with key groove, to the outer cylinder, thus an aberration is compensated by varying the air spacing between the front lens group and the rear lens group at the time of focusing when the front lens group and the rear lens group make linear movements with different amounts by the rotation of the focusing ring.

Figure 1:
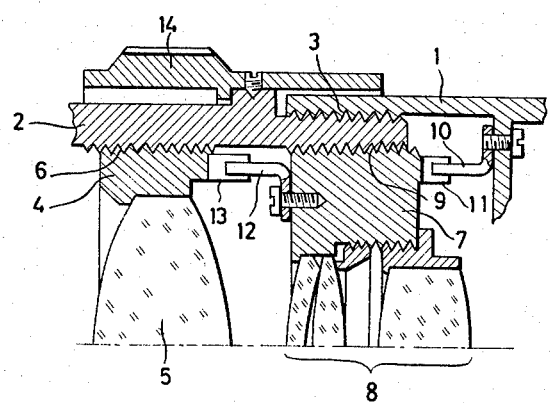

As a photographing lens is so designed in general that the aberration compensation will take the optimum value in infinite photographing, variation will be generated in the aberration as the distance becomes shorter to a close range photography, thus imaging characteristics will be deteriorated. In this case if the air space between lens groups is varied, said variation in aberration is compensated to some extent, and it will be possible to prevent the deterioration of the imaging characteristics in close range photographing. And the present invention relates to a lens barrel in which such adjustment of the air space as mentioned can be made in a linked movement with focusing operation of lens.

While a helicoid is separately provided at each of a front group and a rear group in this kind of lens, it has such shortcomings that the structure is complicated and there is an eccentricity between the front group and the rear group.

The present invention is intended to eliminate said shortcomings.

Now the composition of the present invention shall be explained referring to the drawings.

Figure 2:
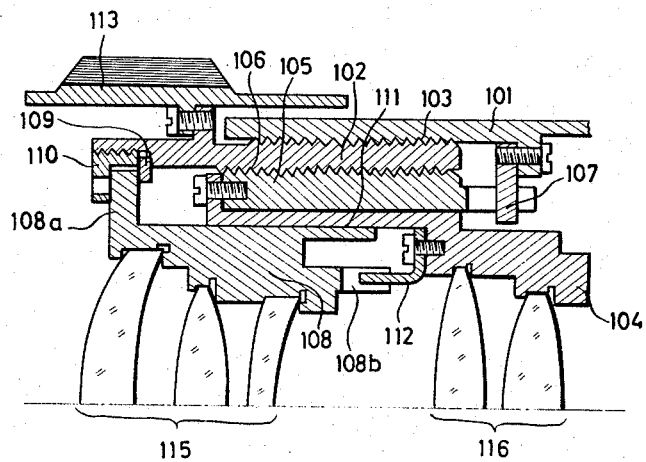

FIG. 1 is a vertical cross sectional side elevation along the optical axis of a lens. FIG. 2 is a cross sectional side elevation of another example.

In FIG. 1, 1 is an outer cylinder fixed to a main body of camera, 2 is a middle cylinder which is screwed to the outer cylinder 1 by a screw part 3, and 4 is a front inner cylinder which holds a front lens group 5 and is screwed to the middle cylinder 2 by a screw part 6. 7 is a rear inner cylinder which holds a rear lens group 8 and is screwed to the middle cylinder 2 by a screw part 9, and 10 is a key having a rear part fixed to the outer cylinder 1 and a front part jointed in a wedge-like manner to a portion 11 of the rear inner cylinder 7. 12 is a key having a rear part fixed to the inner cylinder 7 and a front part jointed in a wedge-like manner to a portion 13 of the front inner cylinder 4 and 14 is a focusing ring fixed to the middle cylinder 2. In this case the screwed parts 3, 6 and 9 are to have such leads as being different from each other.

In the apparatus explained above, as the focusing ring 14 is rotated, the middle cylinder 2 will also be rotated, being shifted fore and aft by the screwed relationship at the screwed part 3. At this time the inner cylinders 4, 7 are also shifted along with the above focusing action, and as the rear inner cylinder 7 is jointed in a wedge-like manner to the key 10 fixed to a fixed outer cylinder 1, it will not be rotated but is shifted in a straight line, and further, it is shifted with a relative movement against the middle cylinder 2 by the screwed relationship of the screwed part 9. On the other hand as the front inner cylinder 4 is jointed in a wedge-like manner to the key 12 which is fixed to the rear inner cylinder 7, it is shifted in a straight line by the rotation of the middle cylinder 2, and in addition thereto it is shifted with a relative movement against the middle cylinder 2 by the screwed relationship at the screwed part 6. But as the lead of the screwed part 6 is different from that of the screwed part 9, the shifting distance of the front inner cylinder 4 is different from the shifting distance of the rear inner cylinder 7, thus the air space between the front lens group 5 and the rear lens group 8 varies. Therefore, if the lead of each screwed part is suitably selected, such lens spacing can be provided between the front lens group and the rear lens group as being suited for compensation of aberration variation depending on a photographing distance, in a linked movement with focusing operation.

In the above example such screwed parts as having different leads are provided at the front portion and the rear portion of the middle cylinder, and a front lens group holder and a rear lens group holder are screwed to their respective screwed part. Contrary to this in the example shown in FIG. 2 the lead of screw in inner portions of the middle cylinder is made different from the lead of screw in the outer portion of the same cylinder, and a front lens group holder is screwed to the outer screwed part while a rear lens group holder is screwed to the inner screwed part.

In FIG. 2, 101 is an outer cylinder of lens having an attaching part (not shown in the drawing) to a main body of camera, 102 is a middle cylinder screwed into the outer cylinder by a screw 103. 104 is a holder to hold a rear lens group 116, and 105 is an inner cylinder which is integrally jointed with the rear lens group holder by screw, etc. The inner cylinder is connected to the middle cylinder 102 with a screw 106 and is engaged with the outer cylinder 101 by a linear shifting key 107.

108 is a front lens group holder holding a front lens group 115, and being inserted into the rear lens group holder at its drum 111. The position of the holder 108 is determined as its flanges 108a provided at its front end is held between a washer 109 and a retainer ring 110 attached to the middle cylinder 102, while it is engaged with the linear shifting key 112 provided at the rear lens group holder 104 at its rear end groove 108b.

113 is a distance adjusting ring fixed to the middle cylinder 102 by some suitable means.

As the adjusting ring 113 is rotated the middle cylinder 102 is also integrally rotated, and the rear lens group holder 104 is shifted in a straight line as much as the synthesized amount of the lead of screw 103 and that of screw 106, while the front lens group holder 108 makes linear shifting as much as the lead of the screw 103 while it is rotated in a relative relationship to the middle cylinder 102, thus the front group and the rear group make different movement to each other, and the air space between the front group and the rear group is varied depending on the distance, thus the aberration can be compensated.

What is claimed is:

1. An axially extending lens barrel for use with a camera, comprising a focusing ring, a middle cylinder, an outer cylinder arranged to be fixed to a camera body, a first lens group and a second lens group spaced axially apart, a first lens group holder and a second lens group holder each located within said middle cylinder, wherein the improvement comprises that said middle cylinder having screw parts each having a different lead on both of the inner and the outer surfaces thereof, said middle cylinder disposed in threaded engagement with said outer cylinder through the screw part on its outer surface, and said middle cylinder disposed in threaded engagement with said first lens group holder and said second lens group holder through at least one screw part on its inner surface, first key means for engaging said second lens group holder to said outer cylinder, second key means for securing said first lens group holder to said second lens group holder, said focusing ring is fixed to said middle cylinder and when said focusing ring is rotated said middle cylinder also rotates and moves axially relative to said outer cylinder due to the threaded engagement provided therebetween, and said first lens group holder and said second lens group holder effect axially linear movement in accordance with the leads of said screw parts on the inner and outer surfaces of said middle cylinder for correcting the air spacing between said first and second lens groups simultaneous with the movement of the entire lens system depending on the distance of photographing.

2. A lens barrel, as set forth in claim 1, wherein said screw parts on said middle cylinder comprise a first screw part on the outer surface thereof in threaded engagement with said outer cylinder and a second screw part on the inner surface thereof in threaded engagement with said second lens group holder, said first lens group holder telescopically inserted into said second lens group holder in addition to the engagement provided therebetween by said second key means, so that as said focusing ring is rotated and thereby rotates said middle cylinder, said first lens group holder effects axially linear movement with said focusing ring through said first screw part on the outer surface of said middle cylinder while said second lens group holder effects axial linear movement in dependence on the amount of the lead of said first and second screw parts provided on the outer and inner surfaces of said middle cylinder for correcting the air spacing between said first and second lens groups simultaneously with the shifting of the entire lens system corresponding to the distance of photographing.

3. A lens barrel, as set forth in claim 2, wherein said middle cylinder having screw threads formed on its inner surface adjacent the end of the said first lens group holder spaced more remotely from said second lens group holder, said first lens group holder having a flange on its outer periphery of its end spaced more remotely from said second lens group holder, a retainer ring in threaded engagement with said screw threads in the end of said middle cylinder adjacent said flange, a washer positioned between said retainer ring and said middle cylinder with a portion of said washer being disposed in axially spaced relationship to said retainer ring, said flange on said first lens group holder being secured between said retainer ring and said washer, and said retainer ring and washer being in threaded engagement with said middle cylinder so as to be rotatable with said middle cylinder relatively but unable to move relatively in the direction of the axis of the lens barrel.

References Cited

UNITED STATES PATENTS 2,529,984    11/1950    Altman et al.    350—187
3,437,404    4/1969    Seedhouse    350—255

DAVID SCHONBERG, Primary Examiner

M. J. TOKAY, Assistant Examiner

U.S. Cl. X.R.

350—148